United States Patent [19]

Asanaka et al.

[11] Patent Number: 5,459,179
[45] Date of Patent: Oct. 17, 1995

[54] REACTIVE PARTICULATE RESIN, METHOD FOR PRODUCING THE SAME, AND RESIN COMPOSITION FOR THERMOFORMING

[75] Inventors: Yasumasa Asanaka; Hiroshi Takeuchi, both of Takarazuka; Masanori Ohiwa, Toyonaka; Tohru Nakatsuka, Settsu; Shuhei Yamoto, Kadoma, all of Japan

[73] Assignees: Ferro Enamels (Japan) Limited; Nippon Paint Co., Ltd., both of Osaka, Japan

[21] Appl. No.: 566,744

[22] Filed: Oct. 26, 1992

Related U.S. Application Data

[63] Continuation-in-part of Ser. No. 753,480, Sep. 3, 1991, abandoned.

[30] Foreign Application Priority Data

Sep. 4, 1990 [JP] Japan .................................. 2-234964

[51] Int. Cl.[6] ...................................................... C08K 3/20
[52] U.S. Cl. ............................ 523/201; 523/202; 523/514; 523/527; 524/437; 524/494; 524/504
[58] Field of Search ...................................... 523/201, 202, 523/514, 527; 524/437, 494, 504

[56] References Cited

U.S. PATENT DOCUMENTS

| | | | |
|---|---|---|---|
| 3,833,682 | 9/1974 | Dickie et al. | 525/286 |
| 4,387,311 | 6/1983 | Kobayashi et al. | 370/43 |
| 4,740,538 | 4/1988 | Sekutowski | 523/205 |
| 4,766,163 | 8/1988 | Strudwick | 523/509 |
| 4,820,777 | 4/1989 | Kauda et al. | 525/291 |
| 4,833,208 | 5/1989 | Miyazono et al. | 525/285 |
| 4,835,273 | 5/1989 | Murai et al. | 525/36 |
| 4,916,172 | 4/1990 | Hayashi et al. | 523/171 |
| 5,004,774 | 4/1991 | Yeo et al. | 524/262 |
| 5,075,353 | 12/1991 | Hashimoto et al. | 523/209 |
| 5,164,425 | 11/1992 | Uchida et al. | 523/171 |

FOREIGN PATENT DOCUMENTS

| | | |
|---|---|---|
| 0242235 | 10/1987 | European Pat. Off. . |
| 0351141 | 1/1990 | European Pat. Off. . |
| 2351153 | 12/1977 | France . |

OTHER PUBLICATIONS

"Low Profile BMC for Making Transparent Stone Composites" Hoshino et al. 46 Ann. Conf., Composite Instit., Society Plastics Feb. 18–21 1991.

*Primary Examiner*—Paul R. Michl
*Assistant Examiner*—John J. Guarriello
*Attorney, Agent, or Firm*—Millen, White, Zelano, & Branigan

[57] ABSTRACT

The invention provides a thermosetting resin composition for thermoforming which comprises 100 parts by weight of thermosetting resin, 100–400 parts by weight of inorganic filler, and 5–30 parts by weight of reactive particulate resin having on the surface reactive group(s) crosslinkable with said thermosetting resin.

17 Claims, 1 Drawing Sheet

REACTIVE PARTICULATE RESIN, METHOD FOR PRODUCING THE SAME, AND RESIN COMPOSITION FOR THERMOFORMING

CROSS-REFERENCE TO RELATED APPLICATION

This application is a continuation-in-part of application Ser. No. 07/753,480, filed Sep. 3, 1991, now abandoned.

FIELD OF THE INVENTION

The present invention relates to a thermosetting resin composition for thermoforming which comprises a more particulate resin of three-dimensional structure having crosslinkable reactive groups on the surface of the particles. More particularly, the present invention relates to a resin composition such as SMC (sheet molding compound), BMC (bulk molding compound) and other premix materials adapted to be made into bathtubs, washstands, kitchen counters, etc. having a translucent marble pattern.

DESCRIPTION OF THE PRIOR ART

In general, SMC and BMC when used for pressure thermoforming are subject to cracking and a dull surface on account of their shrinkage on curing. To eliminate this drawback, they are mixed with a thermoplastic resin (such as polymethyl methacrylate, polystyrene, polyethylene, polyvinyl acetate, and copolymers thereof) in the form of particles thereof or in the form of dispersion or solution of a crosslinkable monomer. The thermoplastic resin reduces their shrinkage. It separates from the matrix on account of the abrupt heat generation that occurs when the thermosetting resin cures. At the same time, it greatly expands on heating to form micropores and microcracks which cancel out the cure shrinkage of the thermosetting resin. Thus the molded product as a whole decreases in shrinkage.

A serious disadvantage of using a thermoplastic resin for the reduction of cure shrinkage is an impaired translucent appearance of the molded product. This results from the light scattering that takes place at the interface between the matrix and the thermoplastic resin, micropores, and microcracks. In the case of a bathtub or washstand, which comes into contact with hot water, the thermoplastic resin incorporated therein poses another problem associated with durability (e.g., heat resistance and water resistance) because it separates from the matrix at the interface, permitting the entrance of water into micropores and causing the whitening and discoloration of the molded product.

The conventional reactive particulate resin of three-dimensional structure is produced by polymerization of a polyfunctional monomer and a polymerizable monomer. It comes in the following two types and others.

The first type is a particulate resin which is prepared in three steps. The first step involves the synthesis of crosslinked fine particles from a polyfunctional monomer having at least two $\alpha,\beta$-ethylenic unsaturated bonds and a polymerizable monomer having an $\alpha,\beta$-ethylenic unsaturated bond. The second step involves the introduction of active hydrogens onto the particle surface by the use of a hydrophilic monomer or oligomer having an active hydrogen. The third step involves the introduction of ethylenic unsaturated bonds to the particle surface through the reaction of the active hydrogen with a monomer having a terminal ethylenic unsaturated bond. (See Japanese Patent Laid-open No. 84113/1987.)

The second type is a particulate resin formed by emulsion polymerization of a polyfunctional monomer having at least two ethylenic unsaturated bonds (which differ in copolymerization reactivity) and a vinyl-polymerizable monomer reactive only with one of the unsaturated bonds of the polyfunctional monomer, with at least one of the unsaturated bonds of the crosslinkable monomer remaining intact. (See Japanese Patent Laid-open No. 246916/1987.)

The former particulate resin is intended for incorporation into a solvent-based paint composition which forms a coating film having superior physical properties such as hardness, abrasion resistance, tensile strength, and heat resistance. The latter particulate resin is intended for immobilization of a functional polymer or dissimilar substance on the particle surface or incorporation into a solvent-based paint composition for the improvement of application property and storage stability. Consequently, none of these particulate resins has been used as a shrinkage reducing agent for BMC and SMC.

SUMMARY OF THE INVENTION

It is an object of the present invention to provide a thermosetting resin composition for thermoforming which contains a more reactive particulate resin. The resin composition produces molded product having a translucent appearance and good durability.

The present invention is based on the finding that the above-mentioned problems are solved if the resin composition has incorporated therein a more particulate resin of three-dimensional structure which has crosslinkable reactive groups on the surface of the particles which resin achieves a reduction in shrinkage upon thermoforming the resin composition.

DETAILED DISCUSSION

Hereinafter, "%" and "parts" mean "wt %" and "parts by weight", respectively, throughout the specification and the claims.

According to the invention, there is provided a thermosetting resin composition for thermoforming which comprises 100 parts by weight of thermosetting resin, 100–400 parts by weight of inorganic filler, and 5–30 parts by weight of a reactive particulate resin having on the surface of the particles reactive group(s) crosslinkable with said thermosettig resin.

Examples of the thermosetting resin is an unsaturated polyester resin, thermosetting acrylic resin and vinyl ester resin, etc.

The reactive group(s) of said reactive particulate resin is(are) preferably an ethylenic unsaturated bond.

The preferable reactive particulate resin comprises a core of three-dimensionally crosslinked resin having a degree of crosslinking, viz., from 0.05 to 2.0 mmol/g, and a shell formed thereon having a radical-polymerizable ethylenic unsaturated bond. The shell is formed, for. example, by the polymerization of one or more polyfunctional monomers (A) and one or more non-aromatic radical-polymerizable monomers (B), said polyfunctional monomer (A) having in the molecule at least one species selected from the group consisting of 1-monosubstituted and 1,1-disubstituted radical-polymerizable ethylenic unsaturated bonds (a) and also having in the molecule at least one of at least one species of unsaturated bonds selected from the group consisting of 1,2-disubustituted, 1,1,2-trisubstituted, and 1,1,2,2-tetrasubstututed radical-polymerizable ethylenic unsaturated bonds (b). However, the reactive particle resin of this invention is not limited to the above-described examples.

The core particle can be formed from a vinyl-polymerizable monomer and a crosslinkable monomer having at least two copolymerizable ethylenic unsaturated bonds by emulsion polymerization, with the amount of the monomers being such that the core particle has a degree of crosslinking from 0.05 to 2.0 mmol/g.

The core particle can also be formed by emulsion polymerization from a mixture composed of a polyfunctional monomer (A), a radical-polymerizable monomer (B), and a polyfunctional monomer (C) having in the molecule at least two of at least one species of 1-monosubstituted and 1,1-disubstituted radical-polymerizable ethylenic unsaturated bonds.

The reactive particulate resin of the present invention is produced by a method which comprises a first step of synthesizing particle cores formed from a three-dimentionally crosslinked resin having a degree of crosslinking in the range form 0.05 to 2.0 mmol/g, and a second step of forming on the surface of said particle core a shell having a radical-polymerizable ethylenic unsaturated bond, by polymerization of one or more polyfunctional monomers (A) and one or more non-aromatic radical-polymerizable monomers (B), said polyfunctional monomer (A) having the molecule at least one species of unsaturated bonds selected from the group consisting of 1-monosubstituted and 1,1-disubstituted radical polymerizable ethylenic unsaturated bonds (a) and also having in the molecule at least one of at least one species of unsaturated selected from the group consisting of 1,2-disubstituted, 1,1,2-trisubstituted, and 1,1,2,2-tetrasubstituted radical-polymerizable ethylenic unsaturated bonds (b).

The reactive particulate resin pertaining to the present invention is unique in that the thylenic unsaturated bond (b) in the shell remains uncopolymerized. When the particulate resin is incorporated into a monomer or thermosetting resin having at least one ethylenic unsaturated bond copolymerizable with the ethylenic unsaturated bond (b), the resulting dispersion (in monomer) or thermosetting resin composition cures through copolymerization of the ethylenic unsaturated bond (b) with an ethylenic unsaturated bond in the monomer or thermosetting resin. This copolymerization permits chemical bonding between the reactive particulate resin and the matrix. Thus the particulate resin reduces molding shrinkage and the chemical bonding eliminates the light scattering at the interface between the reactive particulate resin and the matrix. Which scattered light impairs the translucent appearance of the molded product. Moreover, the chemical bonding between the reactive particulate resin and the matrix greatly improves the heat resistance and water resistance of the molded product.

The reactive particulate resin of the present invention minimizes the molding shrinkage of a resin and gives rise to a molded product having a good translucent appearance, good durability, and high dimensional stability. When incorporated into a thermosetting resin or monomer, the reactive particulate resin forms a stable resin composition or dispersion.

DESCRIPTION OF THE PREFERRED EMBODIMENTS (i) Reactive particulate resin

The preferable reactive particulate resin of the present invention is unique in that each particle is compose of a core and a shell formed thereon which shell has radical-polymerizable ethylenic unsaturated bonds. The core is made of a three-dimensionally crosslinked resin having a degree of crosslinking in the range from 0.05 to 2.0 mmol/g and is formed by the polymerization of one or more polyfunctional monomers (A) and one or more polymerizable monomers (B). The polyfunctional monomer (A) has in the molecule an ethylenic unsaturated bond (a) capable of homopolymerization and an ethylenic unsaturated bond (b) incapable of either homopolymerization or copolymerization with said ethylenic unsaturated bond (a). The polymerizable monomer (B) has an ethylenic unsaturated bond capable of copolymerization with said ethylenic unsaturated bond (a) but substantially incapable of copolymerization with said ethylenic unsaturated bond (b). To be more specific, the functional monomer (A) has at least one species of 1-monosubstituted and 1,1-disubstituted radical-polymerizable ethylenic unsaturated bonds (a) and at least one of at least one species of 1,2-disubstituted, 1,1,2-trisubstituted, and 1,1,2,2-tetrasubstituted radical-polymerizable ethylenic unsaturated bonds (b). The ethylenic unsaturated bond (a) is capable of homopolymerization, but the ethylenic unsaturated bond (b) is substantially incapable of either homopolymerization or copolymerization with said ethylenic unsaturated bond (a). The non-aromatic radical-polymerizable monomer (B) has an ethylenic unsaturated bond capable of copolymerization with said ethylenic unsaturated bond (a) but substantially incapable of copolymerization with said ethylenic unsaturated bond (b).

The reactive particulate resin of the present invention is composed of the core and shell, with the core/shell ratio being in the range from 10/90 to 991 (by weight). With a core/shell ratio smaller than 10/90, the particulate resin gives rise to a molded product which is poor in durability. With a core/shell ratio greater than 99/1, the particulate resin is poor in dispersibility in the resin composition or dispersion. A desired core/shell ratio ranges from 40/60 to 80/20.

The reactive particulate resin of the present invention should have an average particle diameter in the range from 0.01 to 5 μm. With a particle diameter smaller than 0.01 μm, the particulate resin gives rise to a molded product which is poor in dimensional stability. With a particle diameter greater than 5 μm, the particulate resin gives rise to a molded product which is poor in translucent appearance. A desired average particle diameter is in the range from 0.05 to 2 μm.

The shell should have an adequate refractive index which is not greater by 0.05 than that of the resin (matrix) into which the reactive particulate resin is incorporated.

(ii) Production of the reactive particulate resin

The reactive particulate resin of the present invention is produced in the following manner.

(ii-a) The first step

The first step involves the synthesis of the core from a three-dimensionally crosslinked resin. This is accomplished by emulsion polymerization of a vinyl-polymerizable monomer and a crosslinkable monomer having at least two copolymerizable ethylenic unsaturated bonds. The emulsion polymerization is carried out until the degree of crosslinking reaches 0.05–2.0 mmol/g, preferably 0.2–1.0 mmol/g.

The vinyl-polymerizable monomer is not specifically limited. Its examples include the following:

(Meth) acrylates such as methyl acrylate, methyl methacrylate, ethyl acrylate, ethyl methacrylate, n-butyl acrylate, n-butyl methacrylate, isobutyl acrylate, 2-ethylhexyl acrylate, lauryl methacrylate, and phenyl acrylate.

Polymerizable aromatic compounds such as styrene, α-methylstyrene, vinyl ketone, t-butylstyrene, parachlorostyrene, and vinyl naphthalene.

Carboxyl group-containing monomers such as acrylic acid, methacrylic acid, crotonic acid, itaconic acid, maleic acid, and fumaric acid.

Hydroxyl group-containing monomers such as 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol, and methallyl alcohol.

Nitrogen-containing alkyl (meth) acrylates such as dimethylaminoethyl acrylate, dimethylaminoethyl methacrylate, dimethylaminopropyl acrylate, dimethylaminopropyl methacrylate, and dimethylaminopropyl methacrylamide.

Polymerizable amides such as acrylamide, methacrylamide, N-methylolacrylamide, and N-methoxymethylacrylamide. Polymerizable nitriles such as acrylonitrile and methacrylonitrile.

Vinyl halides such as vinyl chloride, vinyl bromide, and vinyl fluoride.

α-Olefins such as ethylene and propylene.

Vinyl compounds such as vinyl acetate and vinyl propionate.

Diene compounds such as butadiene and isoprene.

The crosslinkable monomer is not specifically limited so long as it has in the molecule two or more radical-polymerizable ethylenic unsaturated bonds. Its examples include the following.

Polymerizable ester of an unsaturated monocarboxylic ester of polyhydric alcohol, such as ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, neopentyl glycol dimethacrylate, 1,6-hexanediol diacrylate, 1,6-hexanediol methacrylate, pentaerythritol diacrylate, pentaerythritol dimethacrylate, pentaerythritol triacrylate, pentaerythritol trimethacrylate, pentaerythritol tetraacrylate, pentaerythritol tetramethacrylate, glycerol diacrylate, glycerol dimethacrylate, glycerol acryloxydimethacrylate, 1,1,1-trishydroxylmethylethane diacrylate, 1,1,1-trishydroxymethylethane dimethacrylate, 1,1,1-trishydroxymethylethane triacrylate, 1,1,1-trishydroxymethylethane trimethacrylate, 1,1,1-trishydroxymethylpropane diacrylate, and 1,1,1-trishydroxymethylpropane dimethacrylate. Polymerizable unsaturated alcohol ester of polybasic acid such as diallyl terephthalate, diallyl phthalate, and triallyl trimellitate.

Aromatic compound having two or more substituent vinyl groups, such as divinylbenzene.

Addition compound of a monomer having an epoxy group-containing ethylenic unsaturated bond and a monomer having a carboxyl group-containing ethylenic unsaturated bond, such as a reaction product of glycidyl acrylate or glycidyl methacrylate and acrylic acid or methacrylic acid.

If the emulsion polymerization employs an emulsifier, the amount of the emulsifier should be 0.1–20 parts, preferably 2–10 parts, for 100 parts of the total amount of the monomers. There are no restrictions on the kind of the emulsifier. It includes anionic surfactants, cationic surfactants, amphoteric surfactants, nonionic surfactants, and reactive and non-reactive surfactants. Examples of these surfactants are listed below.

Anionic surfactants such as fatty acid soap, higher alcohol sulfate ester, alkylbenzenesulfonate, and dioctylsulfosuccinate. They are commercially available under the trade names of "Latemul S-120", "Latemul S-180", and "Latemul S-180A" (from Kao Corporation); "Newfrontier A229E" and "Aquaron HS-10" (from Dai-ichi Kogyo Seiyaku Co., Ltd.); "Eleminol JS-2" and "Eleminol SSS" (from Sanyo Chemical Industries, Ltd ); "RA-1022", "RA-1024", "RA-421", "RA-423", and "Antox-MS-2N (7)" (from Nippon Nyukazai Co., Ltd. ); and "SX-1154", "SX-1159", and "SX-1163" (from Asahi Denka Kogyo K.K.).

Nonionic surfactants such as polyethylene glycol alkyl ether, polyethylene glycol alkylphenyl ether, polyethylene glycol fatty acid ester, polypropylene glycol, polyethylene glycol ether, and polyoxyethylene sorbitan fatty acid ester. Commercial reactive nonionic emulsifiers such as "Newfrontier N-177E" and "Aquaron RN-20" (from Dai-ichi Kogyo Seiyaku Co., Ltd.); "RMA-862", "RA-951", "RA-953", "RA-954", "RA-955", "RA-957", and "RA-958" (from Nippon Nyukazai Co., Ltd.); "SX-1151", "SX-1152", "SX-1156", and "SX-1157" (from Asahi Denka Kogyo K.K.).

Commercial reactive cationic emulsifiers such as "Latemul K-180" (from Kao Corporation); and "RF-755" and "RF-756" (from Nippon Nyukazai Co., Ltd.).

Preferred emulsifiers are reactive emulsifiers and polyester-based emulsifiers having amphoteric ionic groups. (See Japanese Patent Laid-open Nos. 151727/1981 and 34725/1981.)

The method for preparing the core particles is not limited to the one described above. Other methods include the well-known suspension polymerization, dispersion polymerization, and method for producing artificial latex. In addition, the crosslinking may be accomplished by addition reaction and condensation reaction as by well as radical polymerization. These reactions involve a the combination of functional groups, such as (carboxylic acid+amino group)/epoxy group, (hydroxyl group+amino group)/isocyanate, (carboxylic acid+hydroxyl group)/melamine, and amino group/active ester group.

The core particles can also be formed by emulsion polymerization of a mixture of the above-mentioned polyfunctional monomer (A), the above-mentioned radical-polymerizable monomer (B), and a polyfunctional monomer (C) which has in the molecule at least two of 1-monosubstituted radical-polymerizable ethylenic unsaturated bonds or 1,1-disubstituted radical-polymerizable ethylenic unsaturated bonds or both.

The polymerization reaction (as the first step) may be carried out in the presence of a radical polymerization initiator, if necessary. There are no restrictions on the kind of initiator. Common examples of the initiator employed are listed below. Solvent-soluble peroxides such as benzoyl peroxide, parachlorobenzoyl peroxide, lauryl peroxide, and t-butyl perbenzoate. Water-soluble peroxides such as potassium persulfate and ammonium persulfate. Solvent-soluble azo compounds such, as azobisisobutyronitrile, 2,2'-azobis(2-methylbutyronitrile), and 2,2'-azobis(2,4-dimethylvaleronitrile). Water-soluble azo compounds such as anionic azobiscyanovaleric acid and cationic 2,2'-azobis(2-amidinopropane)hydrochloride.

(ii-b) The second step

The second step involves the formation of the shell. It is accomplished by adding dropwise to the aqueous dispersion of the above-mentioned core particles a monomer mixture of one or more of the above-mentioned polyfunctional monomer (A) and one or more of the above-mentioned polymerizable monomer (B) and a solution of the initiator. The polyfunctional monomer (A) has in the molecule at least one species of unsaturated bond selected from 1-monosubstituted and 1,1-disubstitued radical-polymerizable ethylenic unsaturated bonds (a) and at least one of at least one species of unsaturated bond selected from 1,2-disubstituted, 1,1,2-trisubstituted, and 1,1,2,2-tetrasubstituted radical-polymerizable ethylenic unsaturated bonds (b), as mentioned above.

The polyfunctional monomer (A) is prepared by reacting the compound having the ethylenic unsaturated bond (a) with the compound having the ethylenic unsaturated bond (b), whose functional groups are bondable to each other. The reactions suitable for the bonding of the functional groups are reactions known to a person skilled in the art, including a reaction of a carboxylic anhydride group with a hydroxyl group, esterification of a carboxylic group with a hydroxyl group, a reaction of an isocyanate group with a group containing active hydrogen such as a hydroxyl group and a thiol group, a reaction of a carboxylic halide group with a group containing active hydrogen such as a hydoxyl group and a thiol group, a reaction of an epoxy group with a carboxyl group. The compound having an ethylenic unsaturated bond (a) for preparing the polyfunctional monomer (A) is preferably (meth)acryl compound. The examples of the compound include (meth)acrylate monomer having a hydroxy group such as 2-hydroxyethyl (meth)acrylate, 4-hydroxybutyl acrylate, etc; (meth)acrylic acid monomer; (meth)acrylic halide monomer such as (meth)acrylic chloride; (meth)acrylate monomer having an epoxy group such as glycidyl(meth)acrylate, "CYCLOMER M-100" and "A-200" produced by DAICEL Co., Ltd. (meth)acrylate monomer-having an isocyanate group such as 2-isocyanate ethyl(meth)acrylate, etc. The examples of the compound having an ethylenic unsatruated bond (b) include as 1,2-disubstituted compound, maleic anhydride, maleic acid, fumaric acid, glutaconic acid, mono alkyl maleate, mono alkyl fumarate, β-chloro acrylic acid, (iso)crotonic acid, crotyl alcohol, crotonaldehyde; as 1,1,2-trisubstituted compound, angelic acid, tiglic acid, α-ethyl crotonic acid, α-chloro crotonic acid, β-chloro crotonic acid, α-chloro isocrotonic acid, β-chloro isocrotonic acid, citraconic acid, citraconic anhydride, mesaconic acid, mono alkyl mesaconate, chloro maleic acid, mono alkyl chloro maleate, chloro fumaric acid, mono alkyl chloro fumarate, aconitic acid and mono alkyl aconitate; as 1,1,2,2-tetrasubstituted compound, teraconic acid and mono alkyl teraconate.

The preferred polyfunctional monomer (A) is a monomer which is selected from the group consisting of a reaction product of maleic anhydride and 2-hydroxyethyl (meth)acrylate, a reaction product of monobutyl maleate and glycidyl(meth)acrylate, a reaction product of (meth)acrylic chloride and crotyl alcohol, a reaction product of 2-hydroxyethyl (meth)acrylate and citraconic. anhydride, etc.

The non-aromatic radical-polymerizable monomer (B) that can be used in the second step includes those which are exemplified as the vinyl-polymerizable monomer that can be used in the first step. Preferred examples include (meth)acrylate monomers such as methyl acrylate, methyl methacrylate, ethyl acrylate, ethyl methacrylate, n-butyl acrylate, n-butyl methacrylate, isobutyl acrylate, 2-ethylhexyl acrylate, lauryl methacrylate, and phenyl acrylate.

The polyfunctional monomer (A) used in the second step should account for 1–50% in the total monomer that forms the shell. With an amount less than 1%, the polyfunctional monomer (A) does not form a sufficiently strong interface between the fine particles and the resin, with the result that the molded product is poor in durability. With an amount in excess of 50%, the polyfunctional monomer (A) leads to a molded product which is poor in dimension stability. A desired amount of the polyfunctional monomer (A) ranges from 5% to 40%.

The polymerization reaction in the second step may employ an emulsifier, if necessary. The amount and kind of the emulsifier are as mentioned above in connection with the first step.

Usually, the polymerization reaction in the second step is also carried out in the presence of a radical polymerization initiator. There are no restrictions on the kind of initiator. Those exemplified in the explanation for the first step may be used.

The reactive particulate resin of the present invention may be available in the form of dispersion (1–40 parts) in a monomer (alone or in combination with other monomers) which has at least one ethylenic unsaturated bond capable of copolymerization with the above-mentioned ethylenic unsaturated bond (b).

(iii) Thermosetting resin composition for thermoforming

The above-mentioned reactive particulate resin is incorporated into a thermosetting resin for the reduction of molding shrinkage. The resulting thermosetting resin composition is used for thermoforming. The thermosetting resin composition is composed of a thermosetting resin, an inorganic filler, and a reactive particulate resin.

The thermosetting resin as one of the constituents of the resin composition includes, for example, unsaturated polyester resins, thermosetting acrylic resins, and thermosetting vinyl ester resins.

The inorganic filler as one of the constituents of the resin composition includes, for example, glass powder, aluminum hydroxide, and calcium silicate. (Glass powder has a refractive index of 1.46–1.60 and an average particle diameter of 1–300 μm, preferably 20–100 μm. Aluminum hydroxide has a refractive index of 1.57.) They may be used alone or in combination with one another. The inorganic filler may be surface-treated with a silane coupling agent to impart the translucent marble-like appearance to the molded product and to improve the hot water resistance of the molded product. Preferred inorganic fillers are glass powder (having the above-mentioned refractive index) and aluminum hydroxide and a mixture thereof.

The reactive particulate resin as one of the constituents of the resin composition functions to reduce the molding shrinkage. It should have an average particle diameter of 0.01–5 μm, preferably 0.02–1 μm, and a refractive index of 1.46–1.60.

For the resin composition to give rise to a translucent molded product, it is necessary that the thermosetting resin, inorganic filler, and reactive particulate resin have refractive indexes which are as close to one another as possible, so that the light scattering is minimized at the interface between the resin and the filler and between the resin and the reactive particulate resin. Since the thermosetting resin usually has a refractive index of 1.48–1.57, the refractive index of the inorganic filler and reactive particulate resin should be in the range from 1.46 to 1.60. With a refractive index outside this range, the inorganic filler and reactive particulate resin will bring about considerable light scattering at their interface and hence make the molded product poor in translucent appearance. It is desirable that the refractive index of the inorganic filler and reactive particulate resin should be ±0.05 of that of the thermosetting resin.

A detailed description will be given below of the constituents and molding method of the resin composition pertaining to the present invention.

(A) Thermosetting resin

One of the thermosetting resins that can be used in the present invention is an unsaturated polyester resin which is known well. It comes in the form of syrup which is a solution of an unsaturated polyester prepolymer in an ethylenic unsaturated monomer. The unsaturated polyester prepolymer is derived by polycondensation of at least one polybasic carboxylic acid (including an ethylenic unsaturated polycarboxylic acid) and at least one diol. Examples of the ethylenic unsaturated polycarboxylic acid include maleic acid, maleic anhydride, fumaric acid, itaconic acid, tetrahydrophthalic anhydride, and 3,6-endomethylenetetrahydrophthalic anhydride. The polybasic carboxylic acid to be used in combination with them includes, for example, phthalic anhydride, isophthalic acid, terephthalic acid, tetrachlorophthalic anhydride, adipic acid, sebacic acid, and succinic acid. Examples of the diol include ethylene glycol, diethylene glycol, trigthylene glycol, 1,2-propylene glycol, butanediol, neopentyl glycol, hydrogenated bisphenol A, 2,2-bis(4-oxyethoxyphenyl)propane, and 2,2-bis(4-oxypropoxyphenyl)propane.

The unsaturated polyester prepolymer may be replaced by the one such as diallyl phthalate (DAP) which is derived from a polycarboxylic acid and an ethylenic unsaturated alcohol.

The ethylenic unsaturated monomer includes liquid monomers capable of radical polymerization which may be used alone or in combination with one another. The monomer should be combined with a proper polyester prepolymer which forms a uniform solution. Preferred examples of the monomer include aromatic vinyls such as styrene, vinyltoluene, $\alpha$-methylstyrene, and divinylbenzene, and ethylenic unsaturated esters such as ethyl acrylate, methyl methacrylate, diallyl phthalate, and triallyl cyanurate. These examples are not limitative.

The mixing ratio of the unsaturated polyester prepolymer to ethylenic unsaturated monomer should be from 70:30 to 45:55, preferably from 65:35 to 55:45 (by weight). The prepolymer solution in the monomer should preferably have a viscosity of 50–8000 cP (25° C.).

Another example of the thermosetting resin is a known thermosetting acrylic resin. It is produced by the copolymerization of an acrylate ester or methacrylate ester with another monomer, which is followed by the introduction of a carboxyl group, epoxy group, hydroxyl group, amido group, amino group, or vinyl group (having an ethylenic double bond). It is capable of self-cure in the presence of a catalyst, or it is cured by a crosslinking agent.

Further another example of the thermosetting resin is a vinyl ester resin which consists of ester main chains or ether main chains and terminal vinyl groups. Usually, it is an epoxy acrylate diluted with a polymerizable monomer (such as styrene). The epoxy acrylate is formed by reaction of an epoxy resin (having the bisphenol A skeleton) with an unsaturated monobasic acid such as acrylic acid and methacrylic acid.

(B) Inorganic filler

An example of the inorganic filler is glass powder. For the molded product to have a translucent marble-like appearance, the glass powder should have a refractive index of 1.46–1.60, preferably within plus or minus 0.05 of that of the thermosetting resin. In addition, it should have an average particle diameter of 1–300 µm. The glass powder should be prepared from borosilicate glass having the following composition. $SiO_2$: 40–65%, $B_2O_3$: 2–30%, alkali metal oxide 2–25% alkaline earth metal oxide or ZnO: 5–30% $Al_2O_3$: 0–25% $TiO_2$: 0–10% and $ZrO_2$: 0–10%.

Another example of the inorganic filer is aluminum hydroxide. As in the case of glass powder, it should preferably have a particle diameter in the range of 1 to 300 µm, so that the resulting molded product has a translucent marble-like appearance. It is commercially available under the trade name of "Higilite H-310" or "Higilite H-320" (from Showa Denko K.K.). Aluminum hydroxide functions also as a flame retardant. A mixture of aluminum hydroxide and glass powder can be used as the inorganic filler.

The inorganic filler (such as glass powder and aluminum hydroxide) may be used as such or after surface-treatment with a known silane coupling agent. A preferred silane coupling agent is a silane having in the molecule ethylenic unsaturated bonds and hydrolyzable groups. Examples of such coupling agents include vinyltriethoxysilane, vinyltris-β-methoxyethoxysilane, and γ-methacryloxypropyltrimethoxysilane. They should be used in an amount of 0.01–2 parts for 100 parts of the inorganic filler.

(C) Reactive particulate resin

The reactive particulate resin as a constituent of the resin composition should have a degree of crosslinking and an average particle diameter as specified above. The shell of the particle should have a refractive index which is within plus and minus 0.05 of that of the matrix resin and other constituents. A desired refractive index ranges from 1.46 to 1.60.

(D) Formulation of the resin composition

The resin composition of the present invention is composed of 100 parts of thermosetting resin, 100–400 parts of inorganic filler, and 5–30 parts of the reactive particulate resin.

If the amount of inorganic filler is less than 100 parts, the resulting molded product does not show the translucent marble-like appearance, lacking weightiness and texture. In addition, the molded product suffers from cracking at the molding time and is poor in heat resistance. If the amount of inorganic filler exceeds 400 parts, the resin composition lacks fluidity necessary for molding and the resulting molded product is poor in machinability. In other words, an excess amount of inorganic filler aggravates the moldability of the resin composition and the mechanical properties of the molded product.

If the amount of the reactive particulate resin is less than 5 parts, the resin composition is liable to cracking because the reactive particulate resin does not produce its effect of reducing the molding shrinkage. An adequate amount should be selected so that the reactive particulate resin produces the desired effect. An amount more than 30 parts is economically inadequate.

According to a preferred formulation, the resin composition is composed of 100 parts of thermosetting resin, 150–350 parts of inorganic filler, and 10–20 parts of the reactive particulate resin.

(E) Additional components

The resin composition of the present invention may be incorporated, in addition to the above-mentioned essential components, with optional components which are commonly used for thermosetting resin compositions of this kind according to need. The optional components include fiber reinforcement, coloring agent, internal mold release, thickener, and water retainer. Examples of the fiber reinforcement include glass fiber, aramid fiber, vinylon fiber, polyester fiber, and polyimide fiber, all of which have a fiber length of 0.5–50 mm. Examples of the coloring agent include organic and inorganic pigments and toners thereof. Examples of the internal mold release include metal soap (such as zinc stearate and calcium stearate) and phosphate esters. Examples of the thickener include alkaline earth metal oxide or hydroxide such as magnesium oxide and calcium hydroxide.

The thermosetting resin composition needs a catalyst for its curing. The catalyst includes organic peroxides such as benzoyl peroxide, parachlorobenozyl peroxide, 2,4-dichlorobenzoyl peroxide, lauroyl peroxide, acetyl peroxide, dicumyl peroxide, 2,5-dimethyl-2,5-di(t-butylperoxy)hexane, and t-butyl perbenozate. They may be used alone or in combination with one another. The amount of the catalyst should preferably be 0.3–2.5% of the amount of the resin.

(F) Molding method

The resin composition of the present invention has such a high viscosity that it can take the shape of sheet, lump, rod, and pellet. Therefore, it is used as a material for SMC and BMC to be formed into bathtubs, kitchen counters, washstands, bathroom panels, and table tops which need a translucent appearance. This forming is accomplished by thermoforming as well as pressure thermoforming. There are no restrictions on the forming conditions. The forming temperature ranges from 90° to 160° C. and the forming pressure ranges from 20 to 140 kg/cm$^2$.

EXAMPLES

The invention will be described in more detail with reference to the following examples which are divided into three parts: (a) Production of the reactive particulate resin, (b) Production of molded products from the thermosetting resin composition, and (c) Test of molded products for quality.

(a) Reactive particulate resin

Manufacturing Example 1

(Polyester-type amphoteric emulsifier)

In a glass reactor equipped with a thermometer, reflux condenser, nitrogen inlet, stirrer, and decanter were placed 134 parts of bishydroxyethyltaurine, 130 parts of neopentyl glycol, 236 parts of azelaic acid, 186 parts of phthalic anhydride, and 27 parts of xylene. The reactants were heated with refluxing. The water formed by reaction was removed by azeotropy with xylene. The temperature was gradually raised to 190° C. over about 2 hours after the start of refluxing, and the stirring and dehydration were continued until the acid value (equivalent to carboxylic acid) reached 145. The temperature was lowered to 140° C. To the reactor kept at this temperature was added dropwise 314 parts of glycidyl ester of versatic acid "Cardura E10" (made by Shell Chemical Company) over 30 minutes. Stirring was continued for 2 hours before the completion of reaction. Thus there was obtained a polyester-type amphoteric emulsifier having an acid value of 59, a hydroxyl value of 90, and an average molecular weight of 1054.

Manufacturing Example 2

(Polyfunctional monomer)

In a glass reactor equipped with a thermometer, reflux condenser, air inlet, and stirrer were placed 98 parts of maleic anhydride, 130parts of 2-hydroxyethyl methacrylate, 57 parts of toluene, and 0.5 part of p-methoxyphenol. Reaction was carried out at 110° C. for 1 hour with air bubbling. The reaction liquid was cooled and freed of solvent under reduced pressure. Thus there was obtained a polyfunctional monomer (A) which has an ethylenic unsaturated bond derived from maleic acid and an ethylenic unsaturated bond derived from methacrylic acid. (These radical-polymerizable ethylenic unsaturated bonds differ in reactivity.)

Manufacturing Example 3

(Polyfunctional monomer)

In a glass reactor equipped with a thermometer, reflux condenser, air inlet, and stirrer were placed 172 parts of monobutyl maleate, 149 parts of glycidyl methacrylate, and 0.5 part of p-methoxyphenol. Reaction was carried out at 160° C. for 1 hour with air bubbling, and the reaction liquid was cooled. Thus there was obtained a polyfunctional monomer (A) which has an ethylenic unsaturated bond derived from maleic acid and an ethylenic unsaturated bond derived from methacrylic acid. (These radical-polymerizable ethylenic unsaturated bonds differ in reactivity.)

Manufacturing Example 4

(Polyfunctional monomer)

In a glass reactor equipped with a thermometer, reflux condenser, air inlet, and stirrer were placed 72 parts of crotyl alcohol, 111 parts of triethylamine and 280 parts of toluene, and the temperature was raised to 50° C. To the reactor kept at this temperature was added dropwise a solution consisting of 100 parts of acrylic chloride and 100 parts of toluene over 60 minutes. After the reaction liquid was kept at 50° C. for 30 minutes, 20 parts of ethanol was added and the reaction liquid was further kept at 50° C. for 1 hour, then cooled. The precipitate was filtered off, and the solvent was removed under reduced pressure. Thus there was obtained a polyfunctional monomer (A) which has an ethylenic unsaturated bond derived from acrylic chloride (1-mono substituted compound) and an ethylenic unsaturated bond derived from crotyl alcohol (1,2-disubstituted compound). (These radical-polymerizable ethylenic unsaturated bonds differ in reactivity.)

Manufacturing Example 5

(Polyfunctional monomer)

In a glass reactor equipped with a thermometer, reflux condenser, air inlet, and stirrer were placed 112 parts of citraconic anhydride, 116 parts of 2-hydroxyethyl acrylate, 57 parts of toluene and 0.5 part of p-methoxyphenol. Reaction was carried out at 110° C. for 1 hour with air bubbling. Then, the reaction liquid was cooled and the solvent was removed under reduced pressure. Thus there was obtained a polyfunctional monomer (A) which has an ethylenic unsaturated bond derived from 2-hydroxyethyl acrylate (1-mono substituted compound) and an ethylenic unsaturated bond derived from citraconic anhydride (1,1,2-trisubstituted compound). (These radical-polymerizable ethylenic unsaturated bonds differ in reactivity.)

Example 1

(Production of particulate resin by two-step emulsion polymerization)

In a glass reactor equipped with a thermometer, reflux condenser, nitrogen inlet, and stirrer were placed 213 parts of deionized water and 5.5 parts of reactive emulsifier "Newfrontier A 229E" (made by Dai-ichi Kogyo Seiyaku Co., Ltd.). The reactants were heated to 81°–85° C., with nitrogen bubbling. To the reactor were further added dropwise a monomer mixture composed of 30 parts of styrene, 10 parts of n-butyl acrylate, and 10 parts of neopentylglycol dimethacrylate, and a half of an initiator aqueous solution composed of 20 parts of deionized water, 1 part of azobiscyanovaleric acid, and 0.64 part of dimethylethanolamine, over 30 minutes from separate dropping funnels. As the result of the first step, there were obtained crosslinked core particles.

To the reactor were added dropwise a monomer mixture composed of 15 parts of polyfunctional monomer (A) obtained in Manufacturing Example 2, 17.5 parts of methyl methacrylate, and 17.5 parts of n-butyl acrylate, and the remaining half of the initiator aqueous solution (mentioned above), over 30 minutes from separate dropping funnels. After ageing for 1 hour, the reaction liquid was cooled. Thus there was obtained the reactive particulate resin (1) having an average particle diameter of 0.07 μm and a core/shell ratio of 5/5, with the shell containing ethylenic unsaturated bonds.

Example 2

(Production of particulate resin by two-step emulsion polymerization)

In a glass reactor equipped with a thermometer, reflux condenser, nitrogen inlet, and stirrer were placed 215 parts of deionized water, 10 parts of the emulsifier obtained in Manufacturing Example 1, and 1 part of dimethylethanolamine. The reactants were heated to 81°–85° C., with nitrogen bubbling. To the reactor were further added dropwise a monomer mixture composed of 35 parts of methyl methacrylate, 15 parts of n-butyl acrylate, 15 parts of ethylene glycol dimethacrylate, and 5 parts of polyfunctional monomer (A) obtained in Manufacturing Example 2, and 70% of an initiator aqueous solution composed of 20 parts of deionized water, 1 part of azobiscyanovaleric acid, and 0.64 part of dimethylethanolamine, over 40 minutes from separate dropping funnels. As the result of the first step, there were obtained crosslinked core particles.

To the reactor were added dropwise a monomer mixture composed of 10 parts of polyfunctional monomer (A) obtained in Manufacturing Example 2, 15 parts of methyl methacrylate, and 5 parts of benzyl methacrylate, and the remaining 30% of the initiator aqueous solution (mentioned above), over 20 minutes from separate dropping funnels. After ageing for 1 hour, the reaction liquid was cooled. Thus there was obtained reactive particulate resin (2) having an average particle diameter of 0.11 μm and a core/shell ratio of 7/3, with the shell containing ethylenic unsaturated bonds.

Example 3

(Soap-free cationic particles of large particle diameter)

In a glass reactor equipped with a thermometer, reflux condenser, nitrogen inlet, and stirrer was placed 109 parts of deionized water, which was heated to 75° C. To the reactor were added 5 parts of methyl methacrylate and an aqueous solution composed of 10 parts of deionized water and 0.5 part of 2,2'-azobis(2-aminopropane)hydrochloride "V-50" (made by Wako Junyaku Co., Ltd.), followed by reaction for 10 minutes. To the reactor was further added dropwise over 50 minutes a monomer mixture composed of 40 parts of methyl methacrylate, 20 parts of n-butyl acrylate, and 20 parts of 1,6-hexanediol dimethacrylate, followed by ageing for 20 minutes. To the reactor was added dropwise over 10 minutes a monomer mixture composed of 10 parts of polyfunctional monomer (A) obtained in Manufacturing Example 3 and 10 parts of methyl methacrylate. After ageing for 1 hour, the reaction liquid was cooled. Thus there was obtained a soap-free cationic reactive particulate resin (3) having an average particle diameter of 1.1 μm and a core/shell ratio of 8/2, with the shell containing ethylenic unsaturated bonds.

Example 4

(Production of melamine-crosslinked particles by method for producing artificial latex)

In a glass reactor equipped with a thermometer, reflux condenser, nitrogen inlet, and stirrer were placed 91 parts of water-soluble acrylic resin "Coatax WE-804" (with 50% solids, made by Toray Industries Inc.), 100 parts of melamine resin "Uvan 22" (with 50% solids, made by Mitsui Toatsu Co., Ltd.), and 1.4 parts of triethylamine. To the reactants was slowly added 308 parts of deionized water with stirring for emulsification. The solvent was removed under reduced pressure while deionized water was being replenished. The reaction liquid was kept at 60° C. for 1 week and then cooled. This first step gave crosslinked core particles. The reaction liquid was heated to 81°–85° C. with nitrogen bubbling. To the reactor were added dropwise over 15 minutes a monomer mixture composed of 8 parts of polyfunctional monomer (A) obtained in Manufacturing Example 2 and 2.5 parts of methyl methacrylate, and an initiator aqueous solution composed of 20 parts of deionized water, 0.2 part of azobiscyanovaleric acid, and 0.13 part of dimethylethanolamine, from separate dropping funnels. After ageing for 1 hour, the reaction liquid was cooled. As the result of two-step emulsion polymerization, there was obtained a reactive particulate resin (4) having an average particle diameter of 0.12 μm and a core/shell ratio of 9/1, with the shell containing ethylenic unsaturated bonds.

Example 5

(Production of particulate resin by two-step emulsion polymerization)

In a glass reactor equipped with a thermometer, reflux condenser, nitrogen inlet, and stirrer were placed 213 parts of deionized water and 12.8 parts of reactive emulsifier "Eleminol JS2" (made by Sanyo Chemical Industries, Ltd.). The solution was heated to 81°–85° C., with nitrogen bubbling. After that, the same procedures as those of Example 1 were carried out with the exception of using the polyfunctional monomer (A) which had been prepared in Manufacturing Example 4. Thus there was obtained a reactive particulate resin (5) having an average particle diameter of 0.08 μm and a core/shell ratio of 5/5 with the shell containing ethylenic unsaturated bonds.

Example 6

(Production of particulate resin by two-step emulsion polymerization)

The same procedures as those in Example 2 were carried out with the exception of using the polyfunctional monomer (A) which had been prepared in Manufacturing Example 5. Thus there was obtained a reactive particulate resin (6) having an average particle diameter of 0.10 μm and a core/shell ratio of 7/3 with the shell containing ethylenic unsaturated bonds.

Comparative Example 1

(Single-layered crosslinked particles)

In a glass reactor equipped with a thermometer, reflux condenser, nitrogen inlet, and stirrer were placed 215 parts of deionized water, 10 parts of emulsifier obtained in Manufacturing Example 1, and 1 part of dimethylethanolamine. The reactants were heated to 81°–85° C., with nitrogen bubbling. To the reactor were further added dropwise over 60 minutes a monomer mixture composed of 60 parts of styrene and 40 parts of ethylene glycol dimethacrylate, and an initiator aqueous solution composed of 20 parts of deionized water, 1 part of azobiscyanovaleric acid, and 0.64 part of dimethylethanolamine, from separate dropping funnels. After ageing for 1 hour, the reaction liquid was cooled. Thus there was obtained a styrene-based single-layered crosslinked particulate resin (5) having an average particle diameter of 0.06 μm.

Comparative Example 2

(Particles having no reactive groups)

In a glass reactor equipped with a thermometer, reflux condenser, nitrogen inlet, and stirrer were placed 213 parts of deionized water and 5.5 parts of emulsifier "Eleminol JS2" (made by Sanyo Chemical Industries, Ltd.). The solution was heated to 81°–85° C. with nitrogen bubbling To the reactor were added dropwise over 30 minutes a monomer mixture composed of 30 parts of styrene, 10 parts of n-butyl acrylate, and 10 parts of neopentyl glycol methacrylate, and a half of an initiator aqueous solution composed of 20 parts of deionized water, 1 part of azobiscyanovaleric acid, and 0.64 part of dimethylethanolamine, from separate dropping funnels. This first step gave crosslinked core particles. To the reactor were further added dropwise over 30 minutes a monomer mixture composed of 32.5 parts of methyl methacrylate and 17.5 parts of n-butyl acrylate, and the remaining half of the initiator aqueous solution (mentioned above), from separated dropping funnels. After ageing for 1 hour, the reaction liquid was cooled. Thus there was obtained a core/shell-type crosslinked particulate resin (6) having an average particle diameter of 0.06 μm and a core/shell ratio of 5/5, with the shell having no ethylenic unsaturated bonds.

Comparative Example 3

(Single-layered crosslinked particles having reactive groups)

In a glass reactor equipped with a thermometer reflux condenser, nitrogen inlet, and stirrer were placed 215 parts of deionized water, 10 parts of emulsifier obtained in Manufacturing Example 1, and 1 part of dimethylethanolamine. The reactants were heated to 81°–85° C., with nitrogen bubbling. To the reactor were further added dropwise over 60 minutes a monomer mixture composed of 40 parts of methyl methacrylate, 20 parts of n-butyl acrylate, 10 parts of ethylene glycol dimethacrylate, and 10 parts of polyfunctional monomer (A) obtained in Manufacturing Example 2, and an initiator aqueous solution composed of 20 parts of deionized water, 1 part of azobiscyanovaleric acid, and 0.64 part of dimethylethanolamine from separate dropping funnels. After ageing for 1 hour, the reaction liquid was cooled. Thus there was obtained a single-layered particulate resin (7) having an average particle diameter of 0.09 μm and ethylenic unsaturated bonds.

(b) Thermosetting resin composition and molded product thereof

Example 7

| | |
|---|---|
| Unsaturated polyester resin ("U-Pica 7661" made by Japan U-Pica Co., Ltd.) | 1000 g |
| Glass powder treated with a silane coupling agent ("M-27-S" having a refractive index of 1.548, made by Ferro Enamels (Japan) Limited.) | 2500 g |
| Reactive particulate resin (2) (having a refractive index of 1.53, | 120 g |

| | |
|---|---|
| obtained in Example 2) | |
| Magnesium oxide | 10 g |
| Zinc stearate | 50 g |
| t-Butyl peroctoate | 10 g |
| Chopped strand glass (13 mm long) | 150 g |
| Total | 3840 g |

(i) The above-mentioned components were mixed for 10 minutes in a 5-liter kneader. The intimate mixture was wrapped in a polyethylene film and then in an aluminum-deposited polyethylene terephthalate film. The wrapped mixture was aged in a drying oven at 45° C. for 20 hours. Thus there was obtained a thickened hard resin composition (1) for press molding.

Figure 1:
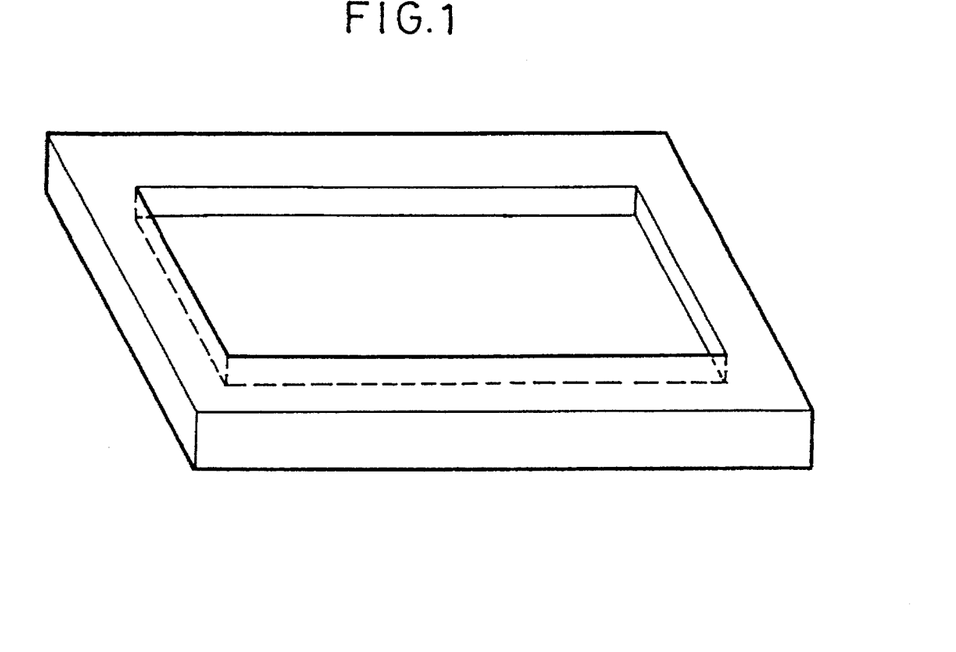
FIG. 1 is a perspective view showing a molded product according to example 7 of the present invention.

(ii) After the removal of wrapping films, the resin composition (1) was cut into pieces of adequate size. A proper amount of the resin composition was placed in a press molding die and press-molded for 5 minutes at a molding temperature of 130° C. and a clamping pressure of 60 kg/cm². Thus there was obtained a molded product (1) as shown in FIG. 1. This molded product (1) was free of cracking, sinkmarks, and warpage, and had good surface gloss and high clarity.

Example 8

| | |
|---|---|
| Unsaturated polyester resin ("U-Pica 7661" made by Japan U-Pica Co., Ltd.) | 1000 g |
| Aluminum hydroxide (having a refractive index of 1.567, "Higilite H-320" made by Showa Denko K.K.) | 2500 g |
| Reactive particulate resin (2) (having a refractive index of 1.53, obtained in Example 2) | 120 g |
| Magnesium oxide | 10 g |
| Zinc stearate | 50 g |
| t-Butyl peroctoate | 10 g |
| Chopped strand glass (13 mm long) | 150 g |
| Total | 3840 g |

The above-mentioned components were mixed and aged in the same manner as in step (i) of Example 7 to give a resin composition (2) for press molding. The resin composition was made into a molded product (2) by press molding in the same manner as in step (ii) of Example 7. The molded product (2) was free of cracking, sinkmarks, and warpage, and had good surface gloss and clarity. It was slightly inferior to the molded product (1) in clarity.

Example 9

| | |
|---|---|
| Unsaturated polyester resin ("U-Pica 7520" made by Japan U-Pica Co., Ltd.) | 1000 g |
| Aluminum hydroxide (having a refractive index of 1.567, "Higilite H-320" made by Showa Denko K.K.) | 1500 g |
| Reactive particulate resin (1) (having a refractive index of 1.48, obtained in Example 1) | 150 g |
| Magnesium oxide | 10 g |
| Zinc stearate | 50 g |
| t-Butyl peroctoate | 10 g |
| Chopped strand glass (13 mm long) | 400 g |

-continued

| | |
|---|---|
| Total | 3120 g |

(i) The above-mentioned components (excluding chopped strand glass) were mixed for 5 minutes in a 5-liter container using a dissolver, to give an SMC premix. This premix was cast and spread on a polypropylene film to give a 2-mm thick premix sheet. The premix sheet was cut in half at its center. The first half of the premix sheet was placed flat, with the premix surface up. On the premix surface was uniformly spread 400 g of chopped strand glass. The second half of the premix sheet was placed, with the premix surface down, on the first half of the premix sheet. Thus there was obtained a layered premix sheet, with glass fiber interposed between them. The layered premix sheet was passed through a two-roll (with a 4-mm clearance) three times so that the glass fiber is completely impregnated with the premix. The premix sheet was tightly wrapped in an aluminum-deposited polyethylene terephthalate film and then aged in a drying oven at 45° C. for 20 hours. Thus there was obtained a thickened hard resin composition (3) for press molding.

(ii) After the removal of wrapping films, the resin composition (3) was cut into pieces of adequate size. With the polypropylene films removed from both sides of the premix sheet, a proper amount of the resin composition was placed in a press molding die and press-molded for 5 minutes at a molding temperature of 130° C. and a clamping pressure of 60 kg/cm². Thus there was obtained a molded product (3) as shown in FIG. 1. This molded product (3) was free of cracking, sinkmarks, and warpage, and had good surface gloss and as high clarity as the molded product (2).

Example 10

| | |
|---|---|
| Vinyl ester resin ("Ripoxy RP-30" made by Showa Highpolymer Co., Ltd.) | 1000 g |
| Glass powder treated with a silane coupling agent ("M-27-S" having a refractive index of 1.548, made by Ferro Enamels (Japan) Limited.) | 2500 g |
| Reactive particulate resin (1) (having a refractive index of 1.48, obtained in Example 1) | 120 g |
| Zinc stearate | 50 g |
| t-Butyl peroctoate | 10 g |
| Chopped strand glass (13 mm long) | 150 g |
| Total | 3830 g |

(i) The above-mentioned components were mixed for 10 minutes in a 5-liter kneader. The intimate mixture was used as such as a resin composition (4) for press molding.

(ii) The resin composition (4) was press-molded in the same manner as in step (ii) of Example 7, to give a molded product (4). This molded product (4) was free of cracking, sinkmarks, and warpage, and had good surface gloss and high clarity.

Example 11

| | |
|---|---|
| Unsaturated polyester resin ("U-Pica 7660" made by Japan U-Pica Co., Ltd.) | 1000 g |
| Trimethylolpropane methacrylate | 300 g |
| Aluminum hydroxide (having a refractive index of 1.567, "Higilite H-320" made by Showa-Denko K.K.) | 3000 g |
| Reactive particulate resin (3) (having a refractive index of 1.49, obtained in Example 3) | 250 g |
| Zinc stearate | 50 g |
| t-Butyl peroctoate | 15 g |
| Chopped strand glass (13 mm long) | 250 g |
| Total | 4865 g |

The above-mentioned components were mixed in the same manner as in step (i) of Example 10 to give a resin composition (5) for press molding. The resin composition was press-molded into a molded product (5) in the same manner as in step (ii) of Example 7. This molded product (5) was free of warpage and had good surface gloss and high clarify, although it had slight cracking at its corners.

Example 12

| | |
|---|---|
| Unsaturated polyester resin ("U-Pica 7661" made by Japan U-Pica Co., Ltd.) | 1000 g |
| Glass powder treated with a silane coupling agent ("M-27-S" having a refractive index of 1.548, made by Ferro Enamels (Japan) Limited.) | 2500 g |
| Reacive particulate resin (4) (having a refractive index of 1.51, obtained in Example 4) | 150 g |
| Magnesium Oxide | 10 g |
| Zinc stearate | 50 g |
| t-Butyl peroctoate | 10 g |
| Chopped strand glass (13 mm long) | 150 g |
| Total | 3870 g |

Unsaturated polyester resin and the reactive particulate resin (4) obtained in Example 4 were mixed for 5 minutes in a 3-liter container using a dissolver, thus causing the reactive particulate resin (4) to be dispersed in the unsaturated polyester resin.

The dispersion obtained and the rest of the above-mentioned components were mixed in the same manner as in step (i) of Example 9 to give a resin composition (6) for press molding. The resin composition (6) was press-molded into a molded product (6) in the same manner as in step (ii) of Example 9.

This molded product (6) was free of cracking, sinkmarks, and warpage, and had such good surface gloss and high clarity as the molded product (1).

Example 13

| | |
|---|---|
| Unsaturated polyester resin ("U-Pica 7661" made by Japan U-Pica Co., Ltd.) | 1000 g |
| Glass powder treated with a silane coupling agent ("M-27-S" having a refractive index of 1.548, made by Ferro Enamels (Japan) Limited.) | 2500 g |
| Reacive particulate resin (5) (having a refractive index of 1.52, | 150 g |

-continued

| | |
|---|---|
| obtained in Example 5) | |
| Magnesium Oxide | 10 g |
| Zinc stearate | 50 g |
| t-Butyl peroctoate | 10 g |
| Chopped strand glass (13 mm long) | 150 g |
| Total | 3870 g |

The above-mentioned components were mixed in the same manner as in step (i) of Example 9 to give a resin composition (7) for press molding. The resin composition (7) was press-molded into a molded product (7) in the same manner as in step (ii) of Example 9.

This molded product (7) was free of cracking, sinkmarks, and warpage, and had such good surface gloss and high clarity as the molded product (1).

Example 14

| | |
|---|---|
| Unsaturated polyester resin ("U-Pica 7661" made by Japan U-Pica Co., Ltd.) | 1000 g |
| Glass powder treated with a silane coupling agent ("M-27-S" having a refractive index of 1.548, made by Ferro Enamels (Japan) Limited.) | 2500 g |
| Reacive particulate resin (6) (having a refractive index of 1.50, obtained in Example 6) | 150 g |
| Magnesium Oxide | 10 g |
| Zinc stearate | 50 g |
| t-Butyl peroctoate | 10 g |
| Chopped strand glass (13 mm long) | 150 g |
| Total | 3870 g |

The above-mentioned components were mixed in the same manner as in step (i) of Example 9 to give a resin composition (8) for press molding. The resin composition (8) was press-molded into a molded product (8) in the same manner as in step (ii) of Example 9.

This molded product (8) was free of cracking, sinkmarks, and warpage, and had such good surface gloss and high clarity as the molded product (1).

Comparative Example 4

| | |
|---|---|
| Unsaturated polyester resin ("U-Pica 7661" made by Japan U-Pica Co., Ltd.) | 1000 g |
| Glass powder treated with a silane coupling agent ("M-27-S" having a refractive index of 1.548, made by Ferro Enamels (Japan) Limited.) | 2500 g |
| Shrinkage reducing agent (in liquid form) (polystyrene dissolved in styrene, "Polylite PB-956" made by Dainippon Ink & Chemicals Inc.) | 300 g |
| Magnesium oxide | 10 g |
| Zinc stearate | 50 g |
| t-Butyl peroctoate | 10 g |
| Chopped strand glass (13 mm long) | 150 g |
| Total | 4020 g |

The above-mentioned components were mixed in the same manner as in step (i) of Example 7 to give a resin composition (6) for press molding. The resin composition (9) was press-molded into a molded product (9) in the same manner as in step (ii) of Example 7. This molded product (9) was free of cracking, sinkmarks, and warpage and had good surface gloss, but it looked turbid and opaque as a whole.

Comparative Example 5

| | |
|---|---|
| Unsaturated polyester resin ("U-Pica 7661" made by Japan U-Pica Co., Ltd.) | 1000 g |
| Glass powder treated with a silane coupling agent ("M-27-S" having a refractive index of 1.548, made by Ferro Enamels (Japan) Limited.) | 2500 g |
| Magnesium oxide | 10 g |
| Zinc stearate | 50 g |
| t-Butyl peroctoate | 10 g |
| Chopped strand glass (13 mm long) | 150 g |
| Total | 3720 g |

The above-mentioned components were mixed in the same manner as in step (i) of Example 7 to give a resin composition (10) for press molding. The resin composition (10) was press-molded into a molded product (10) in the same manner as in step (ii) of Example 7. This molded product (10) was as clear as the molded product (1) but suffered from cracking and was poor in surface gloss.

Comparative Example 6

| | |
|---|---|
| Unsaturated polyester resin ("U-Pica 7661" made by Japan U-Pica Co., Ltd.) | 1000 g |
| Aluminum hydroxide (having a refractive index of 1.567, "Higilite H-320" made by Showa Denko K.K.) | 2500 g |
| Core/shell-type crosslinked particulate resin (6) (having a refractive index of 1.48, obtained in Comparative Example 2) | 120 g |
| Magnesium oxide | 10 g |
| Zinc stearate | 50 g |
| t-Butyl peroctoate | 10 g |
| Chopped strand glass (13 mm long) | 150 g |
| Total | 3840 g |

The above-mentioned components were mixed, followed by ageing, in the same manner as in step (i) of Example 7 to give a resin composition (11) for press molding. The resin composition (11) was press-molded into a molded product (11) in the same manner as in step (ii) of Example 7. This molded product (11) was free of cracking, sinkmarks, and warpage and almost as good as the molded product (2) in surface gloss and clarity.

Comparative Example 7

| | |
|---|---|
| Unsaturated polyester resin ("U-Pica 7520" made by Japan U-Pica Co., Ltd.) | 1000 g |
| Aluminum hydroxide (having a refractive index of 1.567, "Higilite H-320" made by Showa Denko K.K.) | 1500 g |
| Styrene-based single-layered crosslinked particulate resin (5) (Obtained in Comparative Example 1) | 200 g |
| Magnesium oxide | 10 g |
| Zinc stearate | 50 g |
| t-Butyl peroctoate | 10 g |
| Chopped strand glass (13 mm long) | 400 g |
| Total | 3170 g |

The above-mentioned components were mixed in the same manner as in step (i) of Example 9 to give a resin composition (12) for press molding. The resin composition (12) was press-molded into a molded product (12) in the same manner as in step (ii) of Example 9. This molded product (12) was free of cracking, sinkmarks, and warpage and had good surface gloss, but it looked turbid and opaque as a whole.

(c) Quality test of molded products
Test 1 (Clarity and moldability)

A test piece (50 mm square and 5 mm thick) was cut out of each molded product. The test piece was placed on the white part of the hiding power chart approved by the Japan Paint Inspecting Association, and the $L_w$, $a_w$, and $b_w$ values of the test piece were measured using a colorimeter (Minolta CR-A10). The test piece was placed on the black part of the hiding power chart, and the $L_b$, $a_b$, and $b_b$ values of the test piece were measured. The color difference $\Delta E_{wb}$ was calculated from the following formula to judge the clarity of the test piece. The greater the $\Delta E_{wb}$ value, the higher the clarity.

$$\Delta E_{wb} = \sqrt{(L_w - L_b)^2 + (a_w - a_b)^2 + (b_w - b_b)^2}$$

The test piece was also visually examined for moldability. The results of the test are shown in Table 1.

TABLE 1

| Test piece of Molded poduct | Moldability (Cracking) | Clarity $\Delta E_{wb}$ | Visual |
|---|---|---|---|
| Molded product (1) (Example 7) | No cracking | 7.0 | very high |
| Molded product (2) (Example 8) | No cracking | 4.8 | very high |
| Molded product (3) (Example 9) | No cracking | 4.5 | very high |
| Molded product (4) (Example 10) | No cracking | 6.7 | very high |
| Molded product (5) (Example 11) | Slight cracking at corners | 4.2 | very high |
| Molded product (6) (Example 12) | No cracking | 6.8 | very high |
| Molded product (7) (Example 13) | No cracking | 6.9 | very high |
| Molded product (8) (Example 14) | No cracking | 6.7 | very high |
| Molded product (9) (Comp. Example 4) | No cracking | 0.7 | low |
| Molded product (10) (Comp. Example 5) | Severe cracking | 7.2 | very high |
| Molded product (11) (Comp. Example 6) | No cracking | 4.4 | high |
| Molded product (12) (Comp. Example 7) | No cracking | 0.4 | low |

It is noted from Table 1 that the molded products in Examples are superior in moldability and clarity to those in Comparative Examples.

Test 2 (Water resistance)

Figure 2:
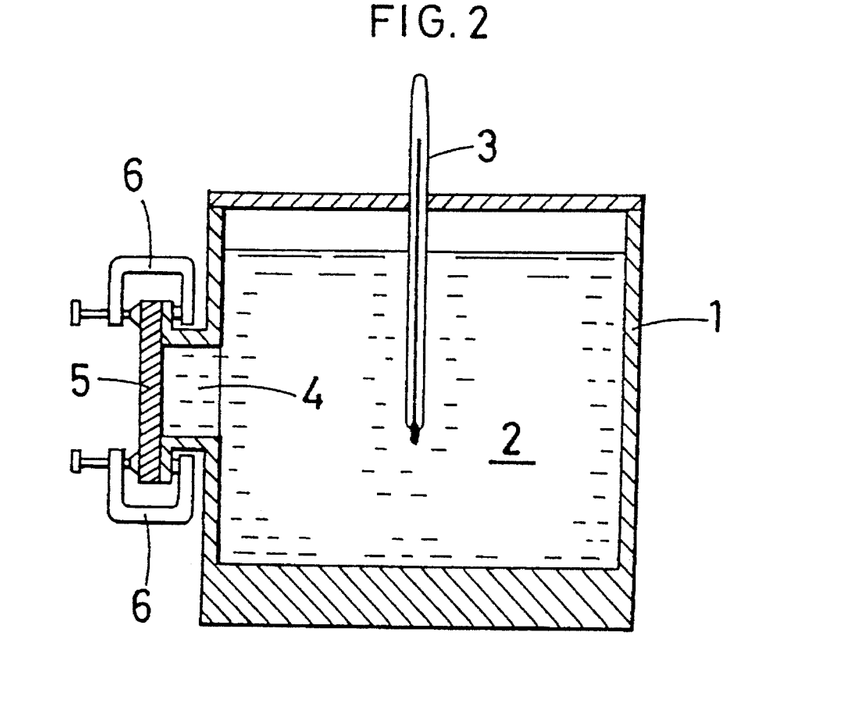
FIG. 2 is a vertical sectional view showing the structure of a hot water test apparatus.

A test piece (80 mm square and 5 mm thick) was cut out of each molded product. The test piece was continuously exposed to hot water (97° C.) for 200 hours using a hot water test apparatus as shown in FIG. 2. The test apparatus is made up of a constant temperature bath (1) containing hot water (2), a thermometer (3), an opening for exposure to hot water (4), and a clamp (6) to fasten the test piece (5).

The clarity $\Delta E_{wb}$ of each test piece was measured in the same manner as mentioned above before and after the hot water treatment. (The test piece was allowed to stand for 24 hours at room temperature before measurement.) The hot water resistance of the test piece was judged from the change in clarity that occurred after the hot water treatment. The test piece was also visually examined for change in surface state. The results are shown in Table 2.

TABLE 2

| Test piece of Molded poduct | Change in $\Delta E_{wb\ after}$ hot water treatment | Change in clarity by hot water treatment | Hot water resistant |
|---|---|---|---|
| Molded product (1) (Example 7) | 18 | very little | excellent |
| Molded product (2) (Example 8) | 54 | slightly whitened | good |
| molded product (3) (Example 9) | 57 | slightly whitened | good |
| Molded product (4) (Example 10) | 15 | very little | excellent |
| Molded product (5) (Example 11) | 51 | slightly whitened | good |
| Molded product (6) (Example 12) | 23 | very little | excellent |
| Molded product (7) (Example 13) | 17 | very little | excellent |
| Molded product (8) (Example 14) | 19 | very little | excellent |
| Molded product (11) | 70 | whitened opacified | poor |

The change in $\Delta E_{wb}$ after hot water treatment was calculated from the following formula. $(A-B)/A \times 100$ (where A is $\Delta E_{wb}$ measured before hot water treatment, and B is $\Delta E_{wb}$ measured after hot water treatment.)

It is noted from Table 2 that the molded products obtained in Examples are superior in hot water resistance to that obtained in Comparative Example.

Test 3 (Heat resistance)

A test piece (50 mm square and 5 mm thick) was cut out of each molded product. The test piece was heated in a drying oven at 200° C. for 10 minutes, followed by cooling to room temperature. The test piece was visually examined for discoloration and change in clarity. The results are shown in Table 3.

TABLE 3

| Test piece of Molded poduct | Discoloration | Change in clarity | Heat resistance |
|---|---|---|---|
| Molded product (1) (Example 7) | slightly yellowed | no change | good |
| Molded product (2) (Example 8) | slightly yellowed | no change | good |
| Molded product (3) (Example 9) | slightly yellowed | no change | good |
| molded product (4) (Example 10) | slightly yellowed | no change | good |
| molded product (5) (Example 11) | no change | no change | excellent |
| Molded product (6) (Example 12) | no change | no change | excellent |
| Molded product (7) (Example 13) | no change | no change | excellent |
| Molded product (8) (Example 14) | no change | no change | excellent |
| Molded product (9) (Comp. Example 4) | yellowed | whitened, opacified | poor |
| Molded product (11) (Comp. Example 6) | slightly yellowed | whitened, opacified | poor |

It is noted from Table 3 that the molded products obtained in Examples are superior in heat resistance to those obtained in Comparative Examples.

Test 4 (Resistance to live cigarette)

A lit cigarette was placed on the molded product for 10 minutes. After the removal of the cigarette butt and ash, the surface of the molded product was washed with acetone and visually checked for change. (The cigarette used for this test was dried in a drying oven at 80° C. for 2 hours.) The results are shown in Table 4.

TABLE 4

| Test piece of Molded poduct | Appearance | Rating |
| --- | --- | --- |
| Molded product (1) (Example 7) | yellow streak, 2 mm wide | good |
| Molded product (2) (Example 8) | no change | excellent |
| Molded product (3) (Example 9) | no change | excellent |
| Molded product (4) (Example 10) | no change | excellent |
| Molded product (5) (Example 11) | no change | excellent |
| Molded product (6) (Example 12) | no change | excellent |
| Molded product (7) (Example 13) | no change | excellent |
| Molded product (8) (Example 14) | no change | excellent |
| Molded product (9) (Comp. Example 4) | yellow trace with white periphery, 4 mm wide | poor |
| Molded product (11) (Comp. Example 6) | brown scorch, 5 mm wide | poor |
| Molded product (12) (Comp. Example 7) | brown scorch, 5 mm wide | poor |

It can be seen from Table 4 that the molded products obtained in Examples are superior in resistance to a lit cigarette to those obtained in the Comparative Examples.

What is claimed is:

1. A thermosetting resin composition for thermoforming which comprises:
   (a) 100 parts by weight of thermosetting resin selected from the group consisting of
      (1) an unsaturated polyester resin,
      (2) a thermosetting acrylic resin, and
      (3) a vinyl ester resin;
   (b) 100–400 parts by weight of inorganic filler, and
   (c) 5–30 parts by weight of a particulate resin comprising
      (1) a core portion of a three-dimensionally cross-linked resin having a degree of cross linking from 0.05 to 2.0 mmol/g, and
      (2) a shell portion on the surface thereof formed from a resin having a radical-polymerizable ethylenic unsaturated bond which renders the particulate resin crosslinkable with said thermosetting resin, wherein the core/shell ratio is 10/90 to 99/1 by weight.

2. A resin composition as claimed in claim 1, wherein said particulate resin comprises a core of three-dimensionally crosslinked resin having a degree of crosslinking from 0.05 to 2.0 mmol/g, and a shell formed thereon having a radical-polymerizable ethylenic unsaturated bond, said shell being formed by polymerization of one or more polyfunctional monomers (A) and one or more non-aromatic radical-polymerizable monomers (B), said polyfunctional monomer (A) having in the molecule at least one species selected from the group consisting of 1-monosubstituted-and 1,1-disubstituted radical-polymerizable ethylenic unsaturated bonds (a) and also having in the molecule at least one of at least one species selected from the group consisting of 1,2-disubustituted, 1,1,2-trisubstituted, and 1,1,2,2-tetrasubstututed radical-polymerizable ethylenic unsaturated bonds (b).

3. A resin composition as claimed in claim 1, wherein the core particle is formed from a vinyl-polymerizable monomer and a crosslinkable monomer having at least two copolymerizable ethylenic unsaturated bonds by emulsion polymerization, with the amount of the monomers being such that the core particle has a degree of crosslinking from 0.05 to 2.0 mmol/g.

4. A resin composition as claimed in claim 2, wherein the core particle is formed by emulsion polymerization from a monomer mixture composed of 1–50% by weight thereof a polyfunctional monomer (A), a radical-polymerizable monomer (B), and a polyfunctional monomer (C) having in the molecule at least two of at least one species of 1-monosubstituted and 1,1-disubstituted radical-polymerizable ethylenic unsaturated bonds.

5. A resin composition as claimed in claim 2, wherein the polyfunctional monomer (A) is a monomer which is obtained by reacting a compound having an ethylenic unsaturated bond (a) selected from the group consisting of (meth)acrylate having hydroxy group, (meth)acrylic acid, (meth)acrylic halide, (meth)acrylate having epoxy group, and (meth)acrylate having isocyanate group, with a compound having an ethylenic unsaturated bond (b) selected from the group consisting of maleic anhydride, maleic acid, fumaric acid, glutaconic acid, mono alkyl maleate, mono alkyl fumarate, β-chloro acrylic acid, (iso)crotonic acid, α-substituted (iso)crotonic acid, β-substituted crotonic acid, crotyl alcohol, crotonaldehyde, angelic acid, tiglic acid, citraconic acid, citraconic anhydride, mesaconic acid, halo maleic acid, halo fumaric acid, aconitic acid, teraconic acid and mono alkyl ester of these acids.

6. A resin composition as claimed in claim 2, wherein the polyfunctional monomer (A) is 5% to 40% by weight of the monomer mixture of a monomer selected from the group consisting of a reaction product of maleic anhydride and 2-hydroxyethyl (meth)acrylate, a reaction product of monobutyl maleate and glycidyl (meth)acrylate, a reaction product of (meth)acrylic chloride and crotyl alcohol, and a reaction product of 2-hydroxyethyl (meth)acrylate and citraconic anhydride.

7. A resin composition as claimed in claim 1, wherein the polyfunctional monomer (A) accounts for 1–50% of the total monomers constituting the shell.

8. A resin composition as claimed in claim 1, wherein the particulate resin has an average particle diameter in the range from 0.01 to 5 μm and a refractive index in the range from 1.46 to 1.60.

9. A resin composition as claimed in claim 1, wherein the inorganic filler is glass powder having a refractive index in the range from 1.46 to 1.60.

10. A resin composition as claimed in claim 1, wherein the inorganic filler is aluminum hydroxide.

11. A resin composition as claimed in claim 1, wherein the inorganic filler is aluminum hydroxide, glass powder or fibers or a mixture thereof, both having a refractive index in the range of 1.46 to 1.60.

12. A resin composition as claimed in claim 1, wherein the inorganic filler is surface-treated with a silane coupling agent.

13. A resin composition as claimed in claim 1, wherein the thermosetting resin is selected from the group consisting of an unsaturated polyester resin, thermosetting acrylic resin and vinyl ester resin; wherein the polyfunctional monomer is 5% to 40% by weight of the monomer mixture of a monomer selected from the group consisting of a reaction product of maleic anhydride and 2-hydroxyethyl (meth)acrylate, a reaction product of monobutyl maleate and glycidyl (meth)acrylate, a reaction product of (meth)acrylic chloride and crotyl alcohol, and a reaction product of 2-hydroxyethyl (meth)acrylate and citraconic anhydride; wherein the particulate resin has an average particle diameter in the range from 0.01 to 5 μm and a refractive index in the range from 1.46 to 1.60; and wherein the inorganic filler is a one or both of aluminum hydroxide and glass powder both having a refractive index in the range from 1.46 to 1.60.

14. A molded product formed of a press mold cured composition of claim 1.

15. A molded product formed of a press mold cured composition of claim 13.

16. A press mold product of claim 14 having a translucent marble-like appearance.

17. A press mold molded product of claim 15 having a translucent marble-like appearance.

* * * * *